United States Patent Office 3,529,239
Patented Sept. 15, 1970

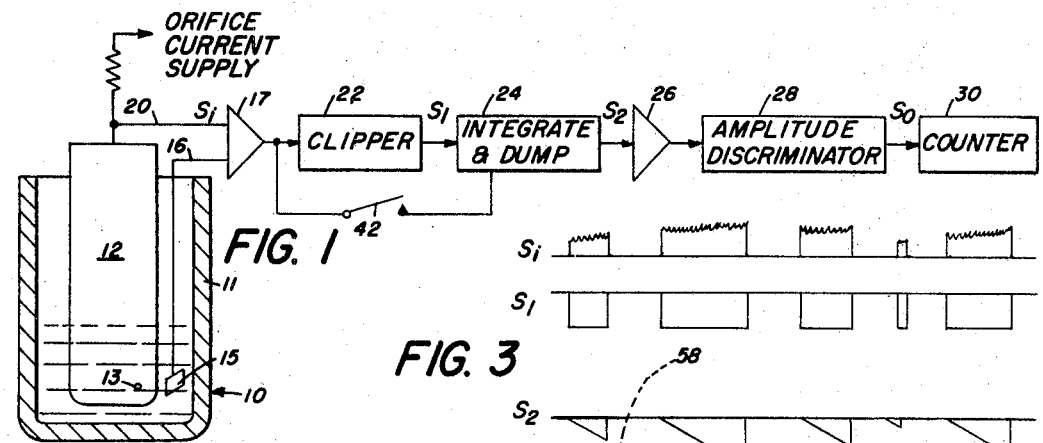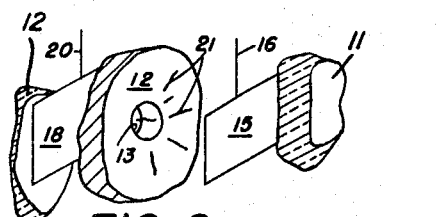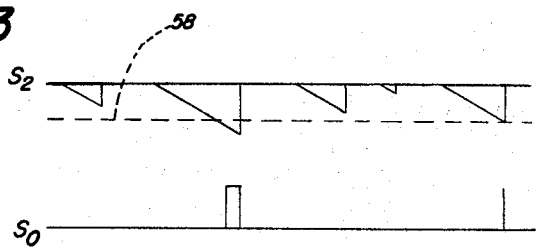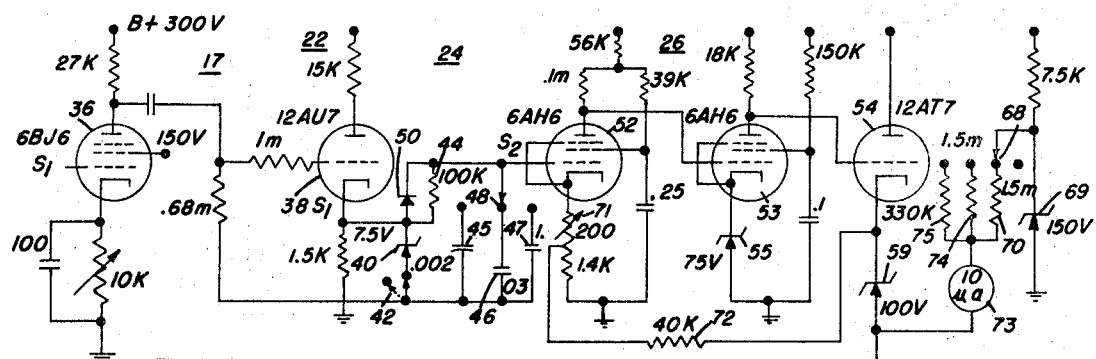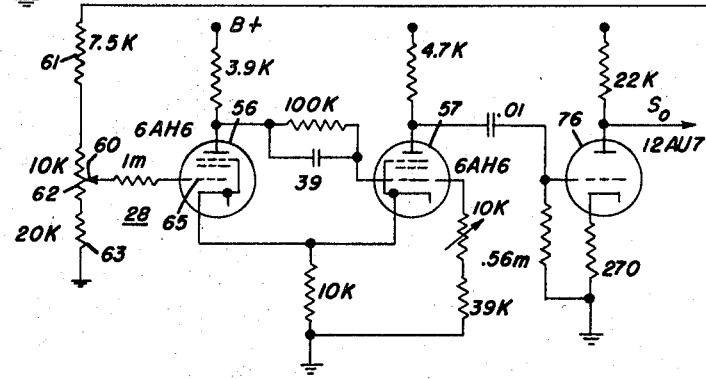

3,529,239
ELECTRODE ARRANGEMENT FOR A PARTICLE MEASURING APPARATUS
Richard B. Valley and Theodore H. Morse, Rochester, N.Y., assignors, by mesne assignments, to Coulter Electronics, Hialeah, Fla., a corporation of Illinois
Application Apr. 29, 1968, Ser. No. 725,228, which is a continuation of application Ser. No. 348,239, Feb. 28, 1964. Divided and this application Sept. 27, 1968, Ser. No. 785,413
Int. Cl. G01n 27/00
U.S. Cl. 324—71                    4 Claims

ABSTRACT OF THE DISCLOSURE

A particle measuring apparatus employing a particle studying circuit wherein electrical insulating means define an orifice and a constricted flow path through which a particle containing fluid sample may communicate, and electrical circuit means for establishing a complete circuit through the fluid sample in said orifice; said circuit means, due to the measurably different electrical characteristics of the fluid and the particles suspended therein, producing detectable pulses as particles are caused to pass through said orifice. The electrical circuit means includes an electrode secured external to and proximate to each of the opposite ends of the orifice and the constricted flow path, so as not to interfere with the flow of the particles through the flow path, such as by causing relative misalignment of the particles within the flow path.

CROSS REFERENCE TO RELATED APPLICATIONS

This application is a divisional of our copending application Ser. No. 725,228, filed Apr. 29, 1968, which was a continuation of our now abandoned application filed on Feb. 28, 1964 with Ser. No. 348,239.

The present invention relates to an improved electrode arrangement for a fiber or particle measuring apparatus.

One apparatus for measuring particles suspended in a fluid is illustrated in the U.S. Letters Pat. 2,656,508 issued Oct. 20, 1953 to W. H. Coulter. This apparatus is arranged to pass a fluid containing particles through a small orifice connecting two vessels each containing an electrode. Except for the orifice the vessels' fluids are electrically insulated. Since the orifice is relatively small compared to the size of the particles being counted, the presence of a particle within the orifice changes the conductivity between the electrodes in accordance with the conductivity of the particles to provide a pulse corresponding to the duration of residence of each particle in the orifice and particle size or volume. By various electrical circuit means, these pulses may be counted so that the number of particles per cubic measurement of the fluid is ascertainable. An improvement to such an apparatus forms our invention.

In the papermaking art, one of the basic variables encountered in manufacture of extremely high quality and uniform paper is the obtaining of a pulp mix having known relative sizes of wood particles therein. One major aim of refining paper is to "shorten" the fiber length of raw pulp to improve forming of paper. Various manufacturing techniques are known to change the relative sizes of the fibers with one of the simplest being to beat the pulp to further break up the fibers and obtain an average smaller fiber mix. However, in order to determine the amount of beating necessary and the effectiveness of such beating, it is, of course, necessary to determine the fiber size before beating and after various predetermined beatings.

Two of the conventional methods of determining the fiber size use microscopic counting or fiber classification. Although fairly reliable, microscopic measurement techniques are slow and expensive and suffer from an inability to study in detail distributions below 0.2 mm. Because of the nature of this process, operator skill and judgment are required, so that operator fatigue may influence a count substantially. On the other hand, the fiber classification method is rapid but gives only one or several point results which, it is hoped, are reasonably related to the over-all fiber length distribution of the given system. Again, operator skill and judgment are requisite. When it is desired to provide fine papers of precisely known quality at competitive costs, it is necessary to use a precise measuring technique that is also rapid. Obviously, simple and reliable instruments for accomplishing such measurement are needed in this art. Because of the difficulty of obtaining rapid and reliable determination of particle-fiber lengths, many skilled in the papermaking art, merely attempt to hold such length as a constant and work with other variables to attain quality control.

When passing particles in fluid suspension through an orifice according to the teachings of Coulter Pat. 2,656,508, the electrodes on opposite sides of the orifice are subject not only to electric current modulated by the passage of the particles, but also to fluid current and impingement by particles carried therein. If, as previously taught, the electrodes are merely hung in the suspension, it is possible for the electrodes to become positionally displaced relative to one another and the orifice. Also, depending upon the position of the electrodes, there could develop an interference to the smooth flow of suspension toward, into, through and out from the orifice; thus, causing interference with the movement of the particles through the orifice, and particulary increasing the probability of orifice blockage. As a result of these conditions, the particle measuring apparatus could be caused to respond less accurately.

Therefore, an object of the present invention is to provide a new, simple and reliable particle measuring apparatus.

A further object is to provide a simple and reliable electrode arrangement for a particle measuring apparatus.

In accordance with one environment of our invention, a particle counter arrangement of the general type marketed by Coulter Electronics, Inc. of Hialeah, Fla., under the trademark "Coulter Counter," is utilized to provide electrical pulses representative of pulp fibers passing through an orifice. We have found that long fibers or particles flowing through an orifice tend to align themselves with the direction of fluid flow whereby they pass through the orifice lengthwise and the detection of pulse duration is a measurement of their length. The resulting pulses are then amplified and clipped to provide rectangular waves of a fixed amplitude having a duration corresponding to the duration of the fiber residence time; hence fiber length. The clipped pulses are then sorted in accordance with their length by applying them to a ramp wave generating system (sometimes referred to as a saw tooth generator), which integrates the pulses so that the longer pulses have the greater peak amplitude. The train of pulses is then applied to an amplitude discriminator which may be arranged to detect pulses greater than any given amplitude within the mix to thereby determine the number of fibers longer than a preselected length. By selecting several amplitudes the discriminator will rapidly provide counts of fibers at several points of a fiber length distribution curve.

The subject matter which is regarded as our invention is particularly pointed out and distinctly claimed in the concluding portion of this specification. The invention, however, as to its organization and operation, together with other objects and advantages thereof, will best be understood by reference to the following description, taken in connection with the accompanying drawings, in which:

FIG. 1 is a block diagram illustrating a typical environment for the present invention;

FIG. 2 is a detailed broken view of the orifice shown in FIG. 1 and detailing a preferred embodiment of the invention;

FIG. 3 illustrates typical wave forms within the electrical portion of the circuit shown in FIG. 1; and FIG. 4 is a circuit diagram illustrating in detail one arrangement of the electronic components employable in the block diagram of FIG. 1.

Referring now to the drawing, wherein like numbers refer to similar parts, we have shown in FIG. 1 a particle detector 10 having an outer vessel 11 and an inner vessel 12 with a small orifice 13 mechanically and electrically coupling the fluids thereof together. Although orifices as small as 150 microns in diameter will usually pass pulp fibers without clogging, we have found that orifices as large as 560 microns in diameter do not cause sufficient overlap in fiber pulse signals to be detrimental. The length of the orifice or thickness of the inner vessel 12 is preferably about 1 mm.

In the outer vessel 11 near the orifice 13 is an electrode 15 coupled by a signal line 16 to an amplifier 17. As shown more clearly in FIG. 2, another electrode 18 resides within the vessel 12 and is coupled by a signal line 20 to the amplifier 17. In order to reduce interference with fiber flow and changing positions of the electrodes, we prefer that the electrode 15 be embedded in, or secured to, the inner surface of the outer vessel 11. The electrode 18 may be similarly embedded in the wall of inner vessel 12.

During the counting operation, a continuous and uniform pressure differential is developed for a predetermined time (or volume of flow) through the orifice 13 whereby a known fluid volume flows at a constant rate between the two vessels. The pressure may be developed by a gravity with the difference of fluid levels affecting the pressure differential or by the use of a mercury column drawing fluid through the orifice 13. Obviously other types of pressure differential means such as pumping means might be used with our invention. However, these systems tend to be more expensive than gravity feed systems without greatly increasing the precision of the fluid flow rate.

During the fluid flow, a signal is developed between the electrodes 15 and 18 in accordance with the electrical impedance of the fluid therebetween. The impedance of the volume of the suspension effectively within the orifice 13 varies whenever a particle or fiber 21 flows therethrough. The extent of the impedance variation is proportional to the difference between electrical conductivity of the fluid and the particle and also is proportional to the volume of the particle effectively within the orifice. According to the basic operating principles of a "Coulter Counter," the amplitude of a particle derived signal, such as at $S_i$ in FIG. 3, is proportional to the volume of the particle in the orifice 13, and the duration of the particle is proportional to the duration of the particle residence in the orifice. Thus, if the particles which elicited the signals $S_i$, which signals are shown to be of similar amplitude, were each shorter than the length of the orifice, then each particle would have the same order of volume, but they would be of different lengths. Now, if the particles are of lengths significantly longer than the orifice, signal amplitude alone is not an exact measure of particle volume, since some of the particle is external the orifice and does not proportionately affect the signal. In such circumstance, signal amplitude and signal duration combine to provide an accurate measure of particle size and volume. Signal amplitude in such conditions is thus proportional to particle cross section.

In accordance with one environment of our invention, the signals $S_i$ are amplified in the amplifier 17 and applied to a clipper circuit 22 to develop rectangular wave forms $S_1$ (FIG. 3) having durations equal to those of the signals $S_i$. The amount of amplification necessary depends to some extent on the relative size of the particles 21 and the orifice 13. These rectangular wave forms $S_1$ are then integrated in an integrate and dump circuit 29 to develop saw tooth waves $S_2$ having amplitudes representative of the duration of the rectangular waves. After further amplification in an amplifier 26, the saw tooth wave forms $S_2$ are applied to an amplitude discriminator 28 so that pulses having an amplitude greater than a predetermined amount will provide trigger pulse output signals $S_o$. The output signals $S_o$ are applied to a pulse counter 30. The counter 30 is most easily exemplified by decimal counting units marketed as DCU's by Berkley Division of Beckman Instruments, Inc. Both the particle detector 10 and the counter 30 are commercially available in the above-mentioned "Coulter Counter" and described in some detail in the above-mentioned patent.

As should now be clear for the purposes set forth herein, specifically the measuring of fiber lengths in a paper pulp, simply counting the number of fibers per unit volume of the pulp does not provide sufficient information to determine the quality of the pulp or the resulting paper. In other words, similar particle counts are obtainable from mixes having very short fibers and a relatively low concentration of fibers in the fluid and fairly long particles in a fluid wherein the fiber concentration is much greater. Despite similar counts, the resulting papers of these two pulps may have few if any similar characteristics. Therefore, it is necessary to develop the detection signal information $S_i$ so that it becomes distinguishable as a function of the several sizes of fibers being detected.

The specific circuitry of the several circuits indicated as blocks in FIG. 1 is illustrated in FIG. 4 wherein the amplifier 17 uses a 6BJ6 vacuum tube 36 arranged to provide class A amplification. The clipper 22 is accomplished in the circuit of a 12AU7 triode 38 coupled as a cathode follower with clipping accomplished by a Zener diode 40 coupled in circuit by a selector switch 42. A Zener diode is an electronic device that becomes conductive at a predetermined voltage such as 10 volts or 100 volts. While conductive, the Zener diode maintains a constant voltage drop (e.g. 10 or 100 volts). The Zener diode 40 is selected to provide a 7½ volt drop to clip the rectangular wave form $S_1$ at that level. The integration circuit as indicated at 24 in FIG. 4 includes a large resistor 44 and a plurality of capacitors 45, 46 and 47 selectable by a switch 48 to provide ramp waves of a selected slope. The dumping of the charged capacitors is accomplished by a diode 50 which dumps through the Zener diode 40 to the ground terminal of the capacitors 45, 46 and 47. The amplifier 26 takes the form of a feedback amplifier using a pair of 6AH6 vacuum tubes 52 and 53 which apply the amplified output signal to a 12AT7 triode 54 operated as a modified cathode follower. The tube 53 has its cathode potential maintained at 75 volts by a Zener diode 55 to attain a suitable voltage level input to the grid of the triode 54.

The discriminator portion of the circuit includes another pair of 6AH6 tubes 56 and 57 operated as a Schmidt trigger (often called a one-shot multivibrator) and receptive of signal information from the cathode of the triode 54. The trigger voltage of the circuit is at a voltage level indicated in a dashed line at 58 (FIG. 3) in accordance with the setting selected of a voltage tap 60 of a potentiometer 62. As shown in FIG. 4, the cathode of the triode 54 is coupled to ground through a resistance network including resistors 61, 62 and 63 with a control grid 65 of the tube 56 being coupled to the potentiometer 62.

In order that the accuracy of the circuit is optimum, a calibration circuit is couplable in parallel with the resistance network 61–63 by a selector switch 68 and includes another Zener diode 69. We prefer that the Zener diode 69 have a precisely controlled voltage drop when in use, as by being maintained at, a constant temperature in an oven. The steady state no signal calibration of the circuit is accomplished by coupling the switch 68 to a large resistor 70 and adjusting a cathode balancing resistor 71 in circuit with the feedback amplifier tube 52 to zero current through a microammeter 73. The feedback signal is attained through a resistor 72 coupling the cathodes of the tubes 52 and 54 and helps to stabilize the circuit gain during operation. Zero adjustment using the smaller resistors 74 and 75 respectively prepares the entire circuit for highly selective operation.

The Schmidt trigger circuit (56–57) has impedance components selected to provide high sensitivity without loss of stability. The final tube 76 of the circuit is primarily to invert the output signal so that it is acceptable to the specific counter being used. Also, being a triode, considerable signal amplification is feasible in this tube.

In addition to determining the particle distribution by taking several readings with the circuits operating as described above, it is a simple matter to determine the particle density or volume. By disconnecting the Zener diode 40 (switch 42) the circuit of the 12AU7 (38) is converted into a simple amplifier rather than a clipper whereby the capacitors 45–47 are charged as a function of both the duration and the magnitude of the signals $S_1$. Since, as earlier described, the volume or cross section of the particles, depending upon their lengths, determines the amplitudes of the signals $S_1$, the amplitudes of the resulting wave forms $S_2$ are substantially proportional to the particle volumes, and the total particle volume may be measured by our apparatus.

While we have shown and described particular embodiments of the present invention, other modifications may occur to those skilled in this art. For instance, it is, of course, feasible if not economically worthwhile, to provide several discriminators set to detect simultaneously several points of the particle length distribution curve. However, we have not found these circuitry modifications necessary for our purposes.

What is sought to be secured under U.S. Letters Patent is:

1. In an apparatus for measuring particles in a suspension,
first and second vessels adapted to contain said suspension,
an orifice in said second vessel defining a constricted flow path coupling said vessels to each other, said flow path extending beyond the physical limits of said orifice and generally axially thereto,
suspension in said vessels being otherwise mechanically and electrically isolated from one another,
a first electrode secured to the inner surface of said first vessel and positioned external to said flow path,
a second electrode secured to the inner surface of said second vessel and positioned external to said flow path,
said electrodes also being positioned proximate opposite extremes of said orifice and the constricted flow path, such that when an electric potential is applied across said electrodes an electric path is formed therebetween through said constricted flow path,
said positions of said electrodes being such that they do not interfere with the flow through said flow path of the particles in the suspension, such as by causing relative misalignment of the particles within said flow path, and
such particle flow effecting a change in electrical parameters of the electric path proportionate to the dimensions of the particles.

2. Apparatus as defined in claim 1 wherein at least one of the vessel surfaces to which the electrodes are secured is spaced from the position of said orifices in said second vessel.

3. Apparatus as defined by claim 1 wherein:
said second vessel is positioned within said first vessel,
said orifice perforates a small portion of said second vessel, and
said second electrode is secured to the inner surface of said second vessel at a position remote from the perforated portion.

4. Apparatus as defined in claim 1 wherein said electrodes are embedded in said inner surfaces of said vessels.

References Cited

UNITED STATES PATENTS 3,165,693   1/1965   Isreeli et al. _____ 324—71

EDWARD E. KUBASIEWICZ, Primary Examiner